United States Patent
Lotem et al.

(10) Patent No.: US 9,524,109 B2
(45) Date of Patent: Dec. 20, 2016

(54) TIERED DATA STORAGE IN FLASH MEMORY BASED ON WRITE ACTIVITY

(71) Applicant: Elastifile Ltd., Herzliya (IL)

(72) Inventors: Eyal Lotem, Pardes Hanna (IL); Eliyahu Weissbrem, Rehovot (IL); Ezra N. Hoch, Tel-Aviv (IL); Shahar Frank, Ramat Hasharon (IL)

(73) Assignee: ELASTIFILE LTD., Herzlia (IL)

( * ) Notice: Subject to any disclaimer, the term of this patent is extended or adjusted under 35 U.S.C. 154(b) by 28 days.

(21) Appl. No.: 14/624,674

(22) Filed: Feb. 18, 2015

(65) Prior Publication Data

US 2016/0239219 A1 Aug. 18, 2016

(51) Int. Cl.
G06F 3/06 (2006.01)

(52) U.S. Cl.
CPC ........... *G06F 3/0611* (2013.01); *G06F 3/0647* (2013.01); *G06F 3/0653* (2013.01); *G06F 3/0688* (2013.01)

(58) Field of Classification Search
CPC .... G06F 3/0688; G06F 3/0647; G06F 3/0611; G06F 3/0653
USPC ....................................................... 711/103
See application file for complete search history.

(56) References Cited

U.S. PATENT DOCUMENTS

| | | | |
|---|---|---|---|
| 8,549,518 B1 | 10/2013 | Aron et al. | |
| 8,601,473 B1 | 12/2013 | Aron et al. | |
| 8,850,130 B1 | 9/2014 | Aron et al. | |
| 8,863,124 B1 | 10/2014 | Aron | |
| 8,874,835 B1 * | 10/2014 | Davis .................... | G06F 3/0679 |
| | | | 711/103 |

OTHER PUBLICATIONS

StevenPoitras.com, "The Nutanix Bible", 54 pages, year 2014.
Hoch et al., U.S. Appl. No. 14/595,236, filed Jan. 13, 2015.
Hoch et al., U.S. Appl. No. 14/595,234, filed Jan. 13, 2015.

\* cited by examiner

*Primary Examiner* — Jasmine Song
(74) *Attorney, Agent, or Firm* — D. Kligler IP Services Ltd.

(57) ABSTRACT

A method includes receiving data objects for storage in at least one or more first storage devices characterized by a first write endurance, and one or more second storage devices characterized by a second write endurance that is lower than the first write endurance. Respective write-activity levels are estimated for the data objects. For each data object, a choice is made whether to store the data object in the first storage devices or in the second storage devices based on an estimated write-activity level of the data object. The data object is stored in the chosen storage devices.

20 Claims, 3 Drawing Sheets

TIERED DATA STORAGE IN FLASH MEMORY BASED ON WRITE ACTIVITY

FIELD OF THE INVENTION

The present invention relates generally to data storage, and particularly to methods and systems for multi-tier data storage.

BACKGROUND OF THE INVENTION

Computer systems commonly store data in Flash-based storage devices, such as Solid State Drives (SSD). Flash memory may be implemented using various Flash technologies, such as Single-Level Cell (SLC), Multi-Level Cell (MLC) or Triple-Level Cell (TLC), which differ from one another in cost, capacity, endurance and speed of access.

SUMMARY OF THE INVENTION

An embodiment that is described herein provides a method including receiving data objects for storage in at least one or more first storage devices characterized by a first write endurance, and one or more second storage devices characterized by a second write endurance that is lower than the first write endurance. Respective write-activity levels are estimated for the data objects. For each data object, a choice is made whether to store the data object in the first storage devices or in the second storage devices based on an estimated write-activity level of the data object. The data object is stored in the chosen storage devices.

In some embodiments, the first storage devices include Multi-Level Cell (MLC) Flash memory, and the second storage devices include Triple-Level Cell (TLC) Flash memory. In some embodiments, the first storage devices and the second storage devices include respective different classes of Flash memory.

In an embodiment, choosing whether to store the data object in the first or second storage devices includes choosing the first storage devices when the write-activity level exceeds a threshold, and choosing the second storage devices when the write-activity level is below the threshold. In a disclosed embodiment, storing the data object includes initially storing the data object in the first storage devices, and then optionally rewriting the data object to the second storage devices depending on the write-activity level.

In some embodiments, storing the data object includes storing metadata that is indicative of a storage location of the data object in the first or second storage devices. When the data object is stored in the second storage devices, storing the metadata may include storing authoritative metadata, including an authoritative indication that points to the storage location of the data object, and further storing cached-location metadata, including a first indication that aims to point to the storage location of the data object and a second indication that points to the authoritative indication.

In an embodiment, the method includes accessing the data object using either the first indication or the second indication. In an embodiment, the method includes updating only the authoritative metadata and not the cached-location metadata upon a change in the storage location of the data object. In an embodiment, the method includes aggregating a plurality of deletions of data objects from the second storage devices, and updating the metadata jointly with the aggregated deletions.

In some embodiments, the method includes accumulating a plurality of the data objects that are destined for storage in the second storage devices, and then storing the accumulated plurality. Storing the accumulated plurality may include performing at least one of compressing the plurality of the data objects and applying a redundant storage scheme to the accumulated plurality of the data objects.

There is additionally provided, in accordance with an embodiment of the present invention, a system including one or more first storage devices, one or more second storage devices, and one or more processors. The one or more first storage devices are characterized by a first write endurance. The one or more second storage devices are characterized by a second write endurance that is lower than the first write endurance. The one or more processors are configured to receive data objects for storage, to estimate respective write-activity levels for the data objects, to choose, for each data object, whether to store the data object in the first storage devices or in the second storage devices based on an estimated write-activity level of the data object, and to store the data object in the chosen storage devices.

The present invention will be more fully understood from the following detailed description of the embodiments thereof, taken together with the drawings in which:

DETAILED DESCRIPTION OF EMBODIMENTS

Overview

Figure 1:
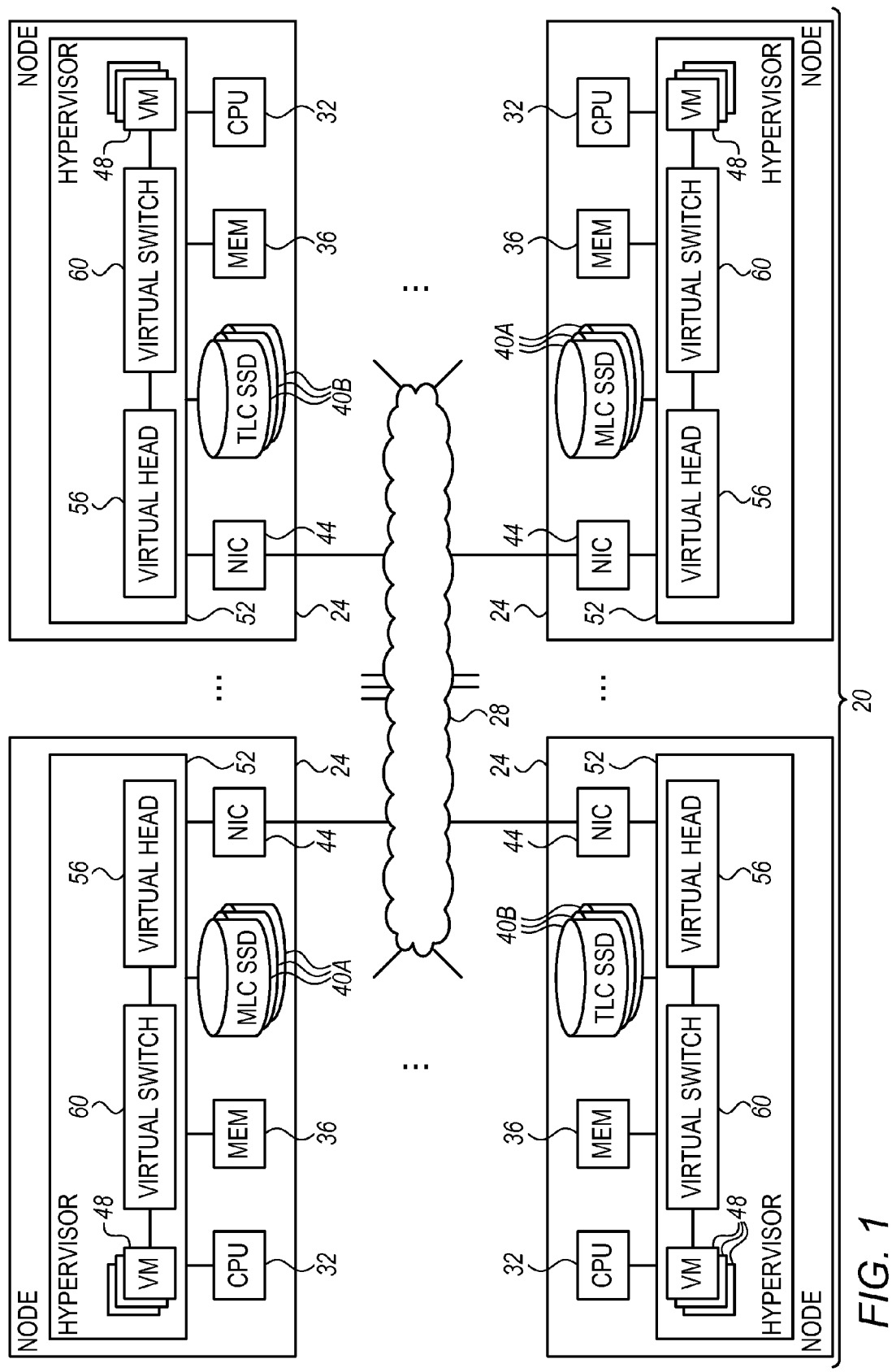
FIG. 1 is a block diagram that schematically illustrates a computing system, in accordance with an embodiment of the present invention.

Embodiments of the present invention that are described herein provide improved methods and systems for storing data in non-volatile storage devices. In some disclosed embodiments, a computing system comprises a heterogeneous plurality of storage devices having various characteristics and performance levels. In particular, storage devices may differ in write speed and write endurance, i.e., the number of write cycles they are specified to endure.

The system stores data efficiently in the storage devices by dividing them into storage tiers, and assigning data objects to tiers based on write-activity levels of the data objects. In an embodiment, the system defines at least a high tier whose storage devices are characterized by high write speed and high write endurance, and a low tier whose storage devices are characterized by lower write endurance. In some embodiments, although not necessarily, the low tier has a lower write speed than the high tier, but on the other hand has higher capacity and lower cost. In one example implementation, the high tier comprises MLC SSDs and the low tier comprises TLC SSDs.

For storing a data object, the system typically estimates the past or predicted write-activity level of the data object. If the write-activity level is high, e.g., the data object has been updated frequently in the past or is expected to be updated frequently in the future, the system stores the data object in the high tier. If the data object has relatively low write-activity, the system stores it in the low tier.

In a typical embodiment, data objects are initially written to the high tier, regardless of their write-activity levels. In parallel, the system runs a background process that scans the data objects in the high tier, identifies data objects having low write-activity levels, and rewrites them to the low tier.

The system typically updates a data object by writing the updated version to the high tier. Thus, a data object typically only moves "downwards" from the high tier to the low tier (when its write activity level becomes low), and not in the opposite direction.

The tiered storage schemes described herein are highly effective in optimizing the use of Flash-based storage devices. For example, different Flash technologies (e.g., SLC, MLC, TLC) differ considerably in write endurance, much less in read speed. As such, it is beneficial to assign data objects to tiers based on write-activity level, as opposed to read-activity or access-activity in general. Moreover, disregarding the read-activity in making tiering decisions causes little or no performance degradation, because the differences in readout speed between different Flash technologies are usually small.

Moreover, the disclosed techniques ensure that highly-active data objects remain in the high tier. The storage devices of the high tier have high write endurance and high write speed, and therefore perform well in handling the repeated updating of these data objects. The storage devices in the low tier, on the other hand, are used for longer-term storage of more static data objects. Such a usage pattern well matches the lower write endurance of the low tier. The disclosed techniques also compensate for the limitations of some storage devices (e.g., consumer-grade SSDs), which are not fully protected against data loss in case of power failure.

In some embodiments, the disclosed techniques are implemented as part of distributed file system across a cluster of compute nodes. Such a cluster often comprises a heterogeneous mix of storage devices, whose usage can be optimized using the tiered storage scheme described herein. In such an implementation, files are typically divided into data objects, and each data object is stored in accordance with its individual write-activity level. Methods of handling metadata in such a scheme are also described.

System Description

FIG. 1 is a block diagram that schematically illustrates a computing system 20, in accordance with an embodiment of the present invention. System 20 may comprise, for example, a data center, a cloud computing system or a computing system that performs any other suitable function.

System 20 comprises multiple compute nodes 24 that communicate with one another over a computer communication network 28. Compute nodes 24 are referred to herein as nodes, for brevity, and may comprise, for example, servers, workstations or any other suitable type of compute node. Nodes 24 may communicate over network 28 in accordance with any suitable network communication protocol, such as Ethernet or Infiniband. System 20 may comprise any suitable number of compute nodes. Nodes 24 may be collocated or located in multiple geographical locations. The collection of nodes 24 is also sometimes referred to as a cluster.

At least some of nodes 24 run clients, such as Virtual Machines (VMs) 48, which in turn run client applications. A given node 24 may run any suitable number of clients, and some nodes may not run clients at all. The description that follows refers mainly to virtualized environments in which the clients comprise VMs. Alternatively, however, the disclosed techniques can be used with various other suitable types of clients, such as OS containers, in either virtualized or non-virtualized environments.

In the present example, each node runs a hypervisor 52, a virtualization layer that mediates between the VMs and physical resources such as CPU, memory, storage and networking, and allocates such physical resources to the VMs. Hypervisor 52 may comprise, for example, VMWare ESXi, Microsoft Hyper-V, Citrix Xen, RedHat KVM, OpenStack, or any other suitable hypervisor.

In the example of FIG. 1, each node 24 comprises a CPU 32, a volatile memory 36 such as Random Access Memory (RAM), and one or more Network Interface Cards (NICs) 44. At least some of the nodes comprise persistent storage devices of various types, in the present example MLC SSDs 40A and TLC SSDs 40B. Hypervisor 52 allocates these physical resources to VMs 48 as needed.

Generally, not every node necessarily comprises all types of physical resources. For example, some nodes may not comprise persistent storage devices. Moreover, a given VM may utilize physical resources that do not necessarily reside locally on the node on which the VM runs.

In particular, hypervisors 52 of nodes 24 run software that jointly implements a distributed File System (FS) for providing file-level persistent storage for VMs 48 in storage devices 40A and 40B. In some embodiments, the distributed FS is implemented using a respective virtual switch (VSW) 60 and a respective virtual head (VHEAD) 56, both comprising software modules that run on the respective hypervisor 52 of each node 24. Further aspects of the structure and functionality of this distributed FS are addressed in a U.S. Patent Application Ser. No. 14/595,236 entitled "Distributed file system for virtualized computing clusters,", whose disclosure is incorporated herein by reference.

The configurations of system 20 and nodes 24 shown in FIG. 1 are example configurations, which are chosen purely for the sake of conceptual clarity. In alternative embodiments, the disclosed techniques can be implemented with any other suitable system and/or node configuration. The different elements of node 24 may be implemented using suitable hardware, using software, or using a combination of hardware and software elements.

In some embodiments, CPUs 32 (which run hypervisors 52 including switches 60 and heads 56) comprise general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Tiered Storage Based on Write Activity

Figure 2:
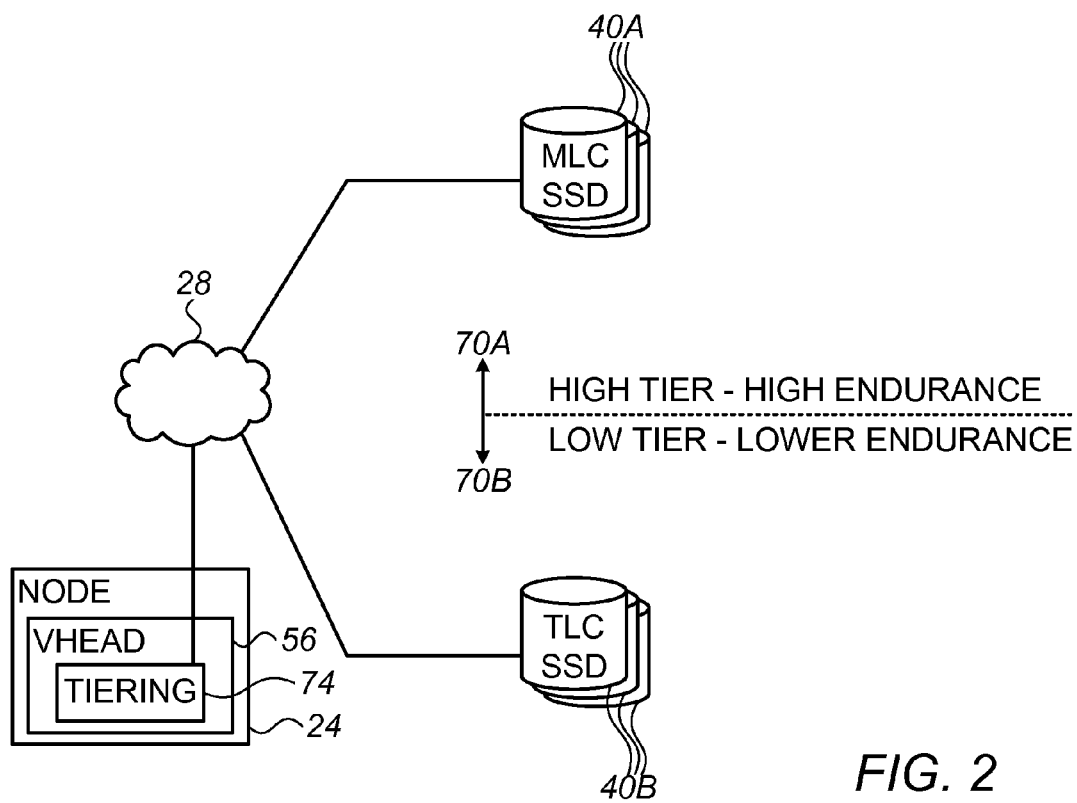
FIG. 2 is a block diagram that schematically illustrates a multi-tier storage scheme, in accordance with an embodiment of the present invention.

FIG. 2 is a block diagram that schematically illustrates a multi-tier storage scheme, in accordance with an embodiment of the present invention. In this embodiment, system 20 comprises a tiering module 74 that divides the storage devices into storage tiers, and stores data objects in the various tiers in a manner that best exploits the characteristics of the different types of storage devices.

In the present example, tiering module 74 assigns MLC SSDs 40A to a high tier 70A, and TLC SSDs 40B to a low tier 70B. Typically, the MLC SSDs are more expensive and have less storage capacity than the TLC SSDs. On the other hand, the MLC SSDs can endure a considerably higher number of write cycles than the TLC SSDs. Thus, the high tier is characterized by high write endurance, and the low tier is characterized by lower write endurance.

The scheme of FIG. 2 is depicted purely by way of example. In alternative embodiments, system 20 may comprise more than two types of storage devices, and the storage devices may be divided into any suitable number of storage tiers.

In alternative embodiments, the high and low tiers may comprise respective different classes of Flash devices. In an example embodiment, the high tier comprises SLC SSDs, and the low tier comprises MLC and/or TLC SSDs. Further alternatively, the high tier may use more expensive and higher-quality MLC Flash devices, while the low tier may use lower-cost and lower-quality MLC Flash devices. In another alternative embodiment, the high tier comprises Non-Volatile Random Access Memory (NVRAM) devices, and the low tier comprises Flash-based (SLC, MLC and/or TLC) SSDs. Generally, a given tier may also comprise storage devices of more than a single type.

In some embodiments, although not necessarily, the low tier has considerably larger storage capacity than the high tier. This configuration is useful, for example, in uses cases in which only a minority of the data objects are updated frequently, while most of the data objects are relatively static.

In the present example tiering module 74 is implemented as a software module that runs in one of virtual heads 56 of one of nodes 24. Alternatively, tiering module 74 may be implemented in any other suitable way, e.g., as a software module that runs on the CPU of one of the nodes separately from the virtual head, or in a distributed manner over multiple CPUs of multiple nodes 24.

Typically, tiering module 74 decides in which tier to store each data object based on the estimated write-activity level of the data object. In the context of the present disclosure and in the claims, the term "write-activity level of a data object" refers to any suitable measure of the past, present or predicted level of write-activity associated with the data object.

Measures of write-activity level may comprise, for example, the time that elapsed since the data object was last updated, the average frequency of updates in a given past time interval, hints or indications that the data object is likely to be updated in the near future or to be updated frequently. Other measures of write-activity level may be more implicit. For example, a data object may belong to a file or a file type that is known to be updated rarely, e.g., a system file, a snapshot, a compressed file, a binary file or a media file such as an image, video or audio file. Tiering module 74 may use any such measure for assessing the write-activity levels of data objects.

Tiering module 74 typically estimates the write-activity level of a data object to be stored. If the estimated write-activity level is high, e.g. above some predefined threshold, module 74 stores the data object in high tier 70A. If the data object has relatively low write-activity, e.g., below a threshold, module 74 stores the data object in low tier 70B. The threshold or thresholds may be fixed or adaptive.

In an embodiment, module 74 writes each data object to the high tier initially, and then rewrites data objects to the low tier as appropriate. Module 74 may run a background process that scans the data objects in high tier 70A, identifies data objects having low write-activity levels, and rewrites the identified data objects to low tier 70B. Writes to the high tier may comprise writes of new data objects, as well as updates to existing data objects that are already stored in the high or low tier.

Figure 3:
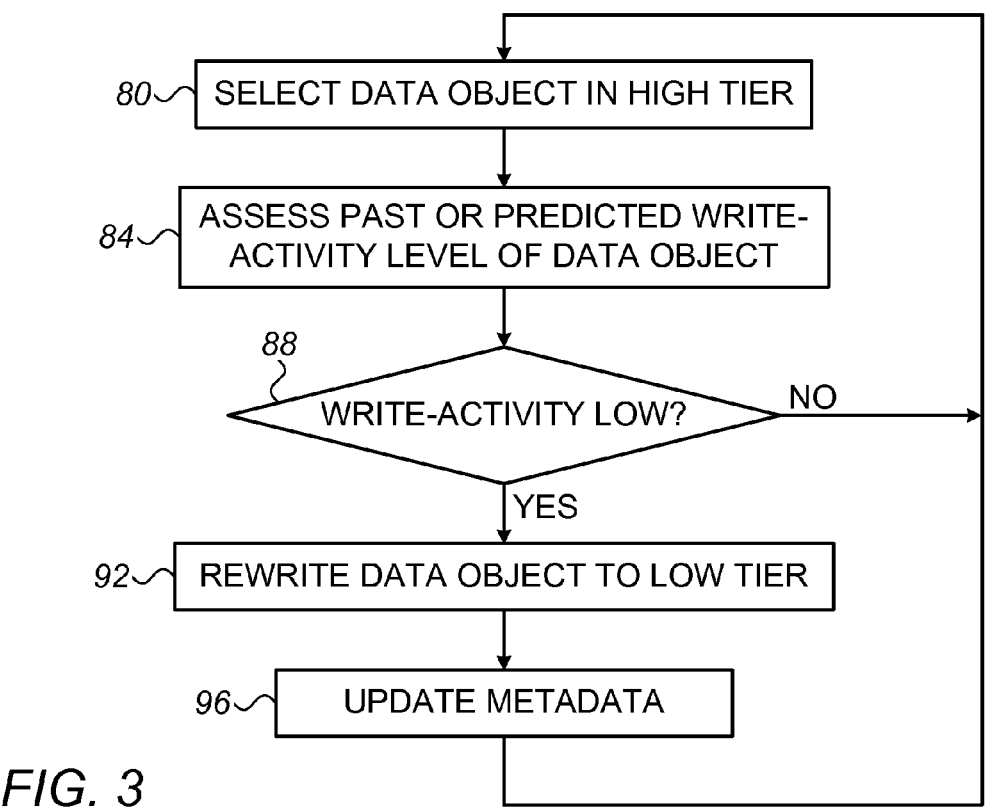
FIG. 3 is a flow chart that schematically illustrates a method for multi-tier storage, in accordance with an embodiment of the present invention.

FIG. 3 is a flow chart that schematically illustrates a background tiering process carried out by tiering module 74, in accordance with an embodiment of the present invention. The method begins with tiering module 74 selecting a data object in high tier 70A, at a selection step 80. Module 74 assesses the write-activity level of the data object, at an activity assessment step 84.

If the estimated write-activity level of the data object is sufficiently high, as checked at a checking step 88, module 74 retains the data object in the high tier. The method thus loops back to step 80 above for selecting the next data object.

If, on the other hand, step 88 concludes that the estimated write-activity level of the data object is low, module 74 rewrites the data object in low tier 70B, at a rewriting step 92. At a metadata updating step 96, module updates the metadata of the appropriate file to reflect the new location of the data object. Module 74 marks the old version of the data object as invalid. The method then loops back to step 80.

In some embodiments, a given file in the file system of system 20 is divided into mapping units, which are further divided into data objects. In an example embodiment, although not necessarily, each mapping unit is 0.5 Mbyte in size, and each data object is 4 Kbyte in size. Tiering module 74 may perform tiering decisions (e.g., estimate write-activity level and store in high or low tier) at any desired granularity, e.g., per data object, per mapping unit or per file.

In some embodiments, module 74 accumulates several data objects that are to be rewritten to low tier 70A, and then rewrites them together to storage devices 40B. This sort of accumulation or aggregation reduces wear-out of the storage devices of the low tier. In addition, when rewriting data objects to the low tier, module 74 may apply compression (or apply a higher level of compression, when the objects in the high tier are already compressed) or redundant storage (e.g., RAID) jointly to the accumulated data objects.

Metadata Aspects

Typically, a given data object is associated with metadata that should also be stored. The metadata of a data object may indicate, for example, the storage location of the data object, creation time, last access time, last modification time, the file or files to which the data object belong, a reference count for de-duplication (e.g., the number of files that use the data object), access permission bits and/or size, and/or any other relevant information.

In some embodiments, module 74 stores the metadata of the various data objects in the high tier, regardless of whether the data objects themselves are stored in the high or low tier.

Figure 4:
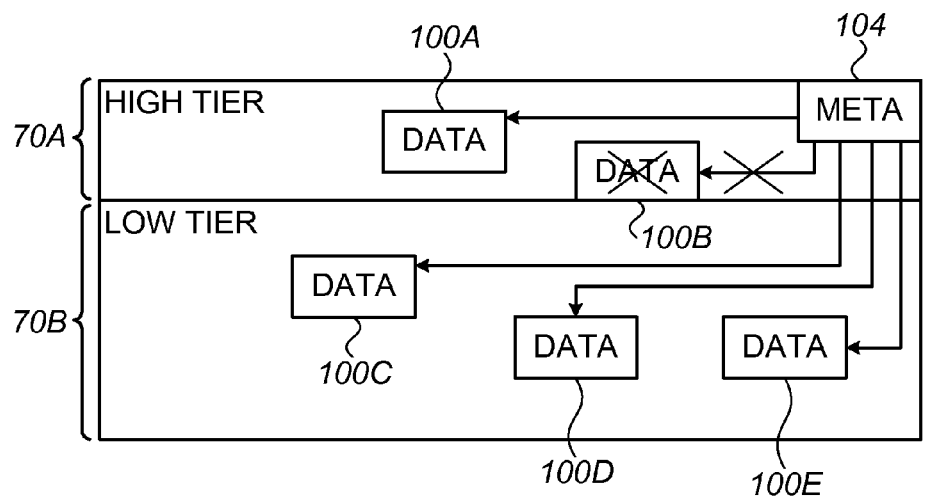
FIGS. 4 and 5 are diagrams that schematically illustrate storage of metadata in a multi-tier storage scheme, in accordance with embodiments of the present invention.

FIG. 4 is a diagram that schematically illustrates storage of metadata in a multi-tier storage scheme, in accordance with an embodiment of the present invention. In the present example, a given file comprises multiple data objects 100A . . . 100E, and metadata 104. In the present example, data object 100B comprises an invalid version of a data object that was moved to the low tier due to low write-activity level.

As can be seen in the figure, some of the data objects are stored in high tier 70A, and other data objects are stored in low tier 70B. Metadata 104, which comprises the metadata for all these data objects, is nevertheless stored in high tier 70A.

In the scheme of FIG. 4, certain data objects may be stored in low tier 70B, but the metadata that indicates their storage locations is stored in high tier 70A. In such a scheme, any change in the storage locations of data objects in the low tier should be accompanied by a corresponding update of metadata 104 in the high tier. Such change of storage locations may occur, for example, as a result of a background compaction or defragmentation process (also referred to as "garbage collection") carried out by system 20 in the low tier.

Figure 5:
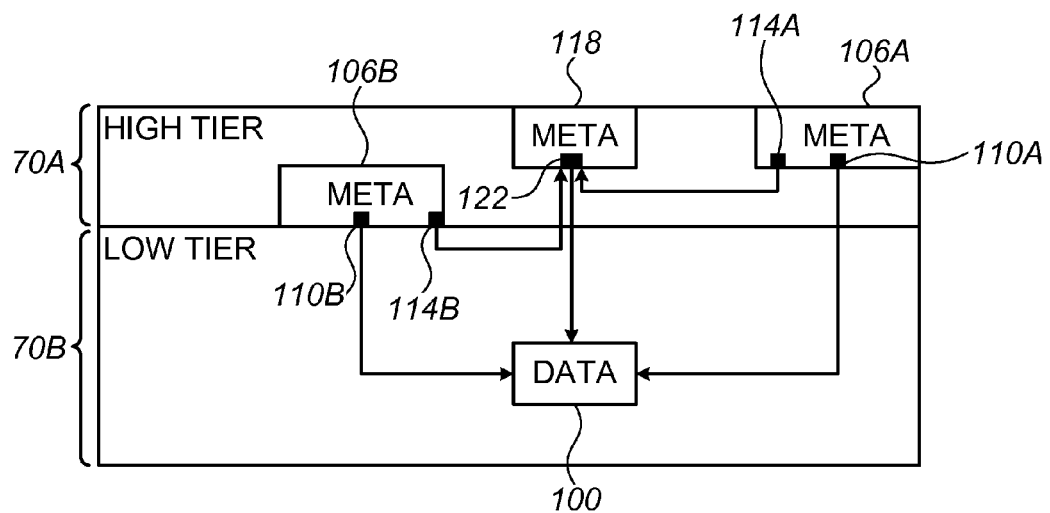

FIG. 5 is a diagram that schematically illustrates storage of metadata in a multi-tier storage scheme, in accordance with an alternative embodiment of the present invention. The scheme of FIG. 5 is slightly more complex to implement than the scheme of FIG. 4, but eliminates the need to update multiple metadata objects in the high tier upon changing storage locations of a data object in the low tier.

FIG. 5 shows an example data object 100 stored in low tier 70B, and the metadata used for accessing this data object. In this embodiment, module 74 stores in high tier 70A two types of metadata objects, referred to as cached-location metadata objects 106 and authoritative metadata objects 118.

For a given data object 100, module 74 stores a single authoritative metadata object 118, which holds an authoritative indication (e.g., pointer) 122 pointing to the storage location of data object 100. In addition, module 74 stores one or more cached-location metadata objects 106 that hold two indications (e.g., pointers)—A first indication 110 points to a last known "cached" storage location of data object 100, and a second indication 114 points to authoritative indication 122 in intermediate metadata object 118.

The above metadata configuration is useful, for example, when data object 100 is pointed to by multiple files, e.g., when using de-duplicated storage. In such a case, tiering module 74 stores a single authoritative metadata object 118, and multiple cached-location metadata objects 106 that point to data object 100, one for each file. In the example of FIG. 5, data object 100 is accessed by two files using respective cached-location metadata objects 106A and 106B. Cached-location metadata objects 106A and 106B point to data object 100 in two ways—Directly using indications 110A and 110B, and indirectly using indications 114A and 114B that both point to authoritative indication 112.

When changing the storage location of object 100 in the low tier, tiering module 74 typically updates only authoritative metadata 118 to reflect the new location, and not the multiple cached-location metadata objects 106, in order to reduce the number of write operations. Thus, indication 122 in metadata 118 always points to the correct storage location of object 100. Indications 110 in cached-location metadata objects 106 may not always point to the correct storage location, and are more opportunistic in nature.

In some embodiments, module 74 accesses data object 100 using indication 110 and/or indication 114, either in series or in parallel. In an example embodiment, module 74 first attempts to access the data object in a single read operation using indication 110. If the attempt fails, i.e., if module 74 concludes that indication 110 is invalid, module 74 accesses data object 100 in two read operations using indication 114 and then 122. In an alternative embodiment, module 74 attempts both access options in parallel, and proceeds with the option that produces a valid result first.

In an alternative embodiment, tiering module 74 designates an SLC area in low tier 70B, and stores metadata object 118 in that area. This technique makes the low tier more self-contained and decoupled from the high tier.

In the schemes of FIGS. 4 and 5, module 74 should update metadata 104 and 118 when data objects in the low tier are deleted. In some embodiments, module 74 does not update metadata 104 and/or 118 immediately following each deletion. Instead, module 74 accumulates several deletions and then performs a single write operation that updates metadata 104 or 118 with the accumulated deletions. This technique reduces the wear-out of the storage devices in the high tier, and allows efficient implementation of a storage system based on heterogeneous types of Flash devices and device ages (and thus wear levels).

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
   receiving data objects for storage in at least:
      (i) one or more first storage devices characterized by a first write endurance; and
      (ii) one or more second storage devices characterized by a second write endurance that is lower than the first write endurance;
   estimating respective write-activity levels for the data objects; and
   for each data object:
      (i) choosing whether to store the data object in the first storage devices or in the second storage devices based on an estimated write-activity level of the data object, and storing the data object in the chosen storage devices; and
      (ii) storing metadata that is indicative of a storage location of the data object in the first or second storage devices, including, when the data object is stored in the second storage devices, storing authoritative metadata, comprising an authoritative indication that points to the storage location of the data object, and further storing cached-location metadata, comprising a first indication that aims to point to the storage location of the data object, and a second indication that points to the authoritative indication.

2. The method according to claim 1, wherein the first storage devices comprise Multi-Level Cell (MLC) Flash memory, and wherein the second storage devices comprise Triple-Level Cell (TLC) Flash memory.

3. The method according to claim 1, wherein the first storage devices and the second storage devices comprise respective different classes of Flash memory.

4. The method according to claim 1, wherein choosing whether to store the data object in the first or second storage devices comprises choosing the first storage devices when the write-activity level exceeds a threshold, and choosing the second storage devices when the write-activity level is below the threshold.

5. The method according to claim 1, wherein storing the data object comprises initially storing the data object in the first storage devices, and then optionally rewriting the data object to the second storage devices depending on the write-activity level.

6. The method according to claim 1, and comprising accessing the data object using either the first indication or the second indication.

7. The method according to claim 1, and comprising updating only the authoritative metadata and not the cached-location metadata upon a change in the storage location of the data object.

8. The method according to claim 1, and comprising aggregating a plurality of deletions of data objects from the second storage devices, and updating the metadata jointly with the aggregated deletions.

9. The method according to claim 1, and comprising accumulating a plurality of the data objects that are destined for storage in the second storage devices, and then storing the accumulated plurality.

10. The method according to claim 9, wherein storing the accumulated plurality comprises performing at least one of compressing the plurality of the data objects and applying a redundant storage scheme to the accumulated plurality of the data objects.

11. A system, comprising:
one or more first storage devices characterized by a first write endurance;
one or more second storage devices characterized by a second write endurance that is lower than the first write endurance; and
one or more processors, which are configured to receive data objects for storage, to estimate respective write-activity levels for the data objects, and, for each data object:
(i) to choose whether to store the data object in the first storage devices or in the second storage devices based on an estimated write-activity level of the data object, and to store the data object in the chosen storage devices; and
(ii) to store metadata that is indicative of a storage location of the data object in the first or second storage devices, including, when the data object is stored in the second storage devices, to store authoritative metadata, comprising an authoritative indication that points to the storage location of the data object, and to further store cached-location metadata, comprising a first indication that aims to point to the storage location of the data object, and a second indication that points to the authoritative indication.

12. The system according to claim 11, wherein the first storage devices comprise Multi-Level Cell (MLC) Flash memory, and wherein the second storage devices comprise Triple-Level Cell (TLC) Flash memory.

13. The system according to claim 11, wherein the first storage devices and the second storage devices comprise respective different classes of Flash memory.

14. The system according to claim 11, wherein the processors are configured to choose to store the data object in the first storage devices when the write-activity level exceeds a threshold, and to choose to store the data object in the second storage devices when the write-activity level is below the threshold.

15. The system according to claim 11, wherein the processors are configured to initially store the data object in the first storage devices, and then optionally rewrite the data object to the second storage devices depending on the write-activity level.

16. The system according to claim 11, wherein the processors are configured to access the data object using either the first indication or the second indication.

17. The system according to claim 11, wherein the processors are configured to update only the authoritative metadata and not the cached-location metadata upon a change in the storage location of the data object.

18. The system according to claim 11, wherein the processors are configured to aggregate a plurality of deletions of data objects from the second storage devices, and to update the metadata jointly with the aggregated deletions.

19. The system according to claim 11, wherein the processors are configured to accumulate a plurality of the data objects that are destined for storage in the second storage devices, and then to store the accumulated plurality.

20. The system according to claim 19, wherein the processors are configured to perform at least one of compressing the plurality of the data objects and applying a redundant storage scheme to the accumulated plurality of the data objects.

* * * * *